Jan. 31, 1928.
R. A. SMITH
SPRING WIRE CONNECTER COUPLING
Filed April 2, 1924
1,657,844
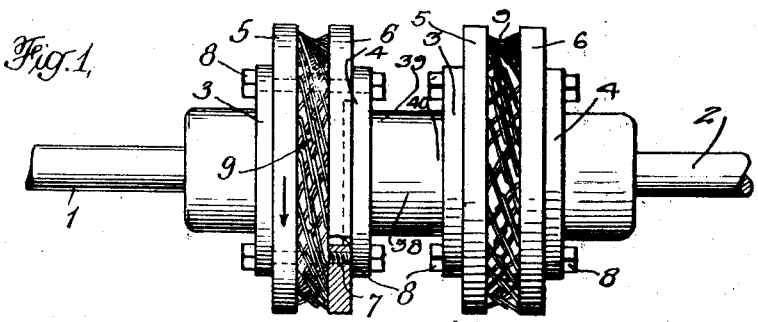
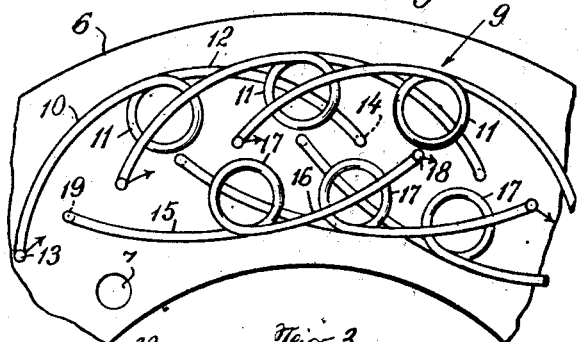
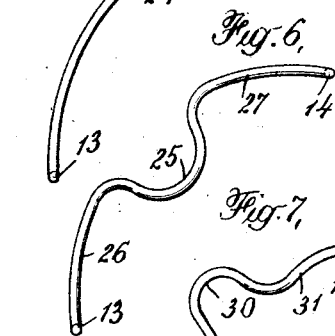
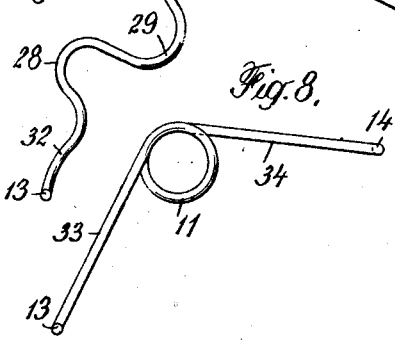
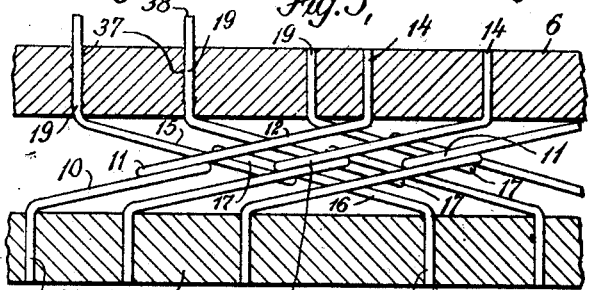
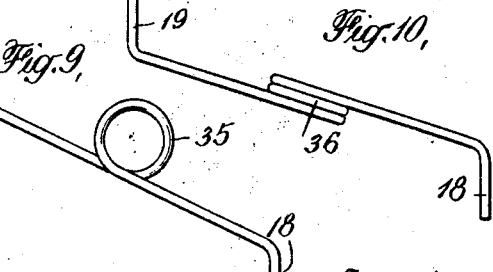
Inventor
Robert A. Smith
By his Attorney
Harry L. Duncan Patented Jan. 31, 1928.

1,657,844

UNITED STATES PATENT OFFICE.

ROBERT A. SMITH, OF MAHWAH, NEW JERSEY, ASSIGNOR TO SMITH AND SERRELL, OF NEWARK, NEW JERSEY, A COPARTNERSHIP CONSISTING OF ROBERT A. SMITH AND JOHN J. SERRELL.

SPRING-WIRE CONNECTER COUPLING.

Application filed April 2, 1924. Serial No. 703,719.

This invention relates especially to resilient or flexible couplings in which one or more radial or circumferential series of resilient connecters, formed of spring wire and preferably having resiliently yielding coils or bent portions, may have their ends rigidly held in flanges or plates which may form the coupling members, or two or more such flanges or plates may be bolted or otherwise secured to or interposed between the two coupling members to constitute between them one, two or more renewable resiliently yielding units in connection with the interposed wire connecters. These connecters may be advantageously formed of resilient steel, brass or bronze wire which can be given high strength by wire drawing methods, and in many cases they may advantageously be bent or arched up so that their intermediate portions are more or less out of line with the ends which may be bent in opposite directions for engagement with holes or sockets in the flanges or coupling members into which they may be rigidly connected in any way as by electric welding or otherwise, so as to prevent or minimize local sliding movement or wear between these parts. These spring wire connecters may be made more or less resilient according to the service and amount of resilient yielding action desired by forming sinuous or other bends or coils preferably adjacent the central portions of the connections and several separated cushioning coils may be formed in each connecter, or one or more multiple turn coils may be formed therein as desired. One or more circumferential series of such spring wire connecters may be interposed between the flanges or other coupling members and it is advantageous to have the connecters arranged in oppositely inclined position so that some of these connecters operate in compression and some in tension; and thus where substantially equal numbers of generally similar resilient connecters are in tension and compression and are symmetrically arranged in the coupling, the axial and radial forces and movements caused by the resilient yielding of the connecters may largely or completely neutralize each other, while at the same time sufficient movement is allowed between the parts to take up the usual amount of angular or radial misalignment under service conditions.

In the accompanying drawing showing in a somewhat diagrammatic way a number of illustrative embodiments of this invention Fig. 1 is an elevation of an illustrative coupling.

Fig. 2 is an enlarged transverse view showing one of the flanges and the cooperating spring wire connecters.

Fig. 3 is a corresponding sectional view taken substantially through the ends of the connecters, and Figs. 4 to 10 are detail views showing different forms of connecters.

The coupling elements may be of any desired form and construction to cooperate with the rotary members to be connected such as the shafts 1 and 2. These coupling members may comprise hubs keyed or otherwise connected to the shafts and comprising the flanges 3, 4 to which the annular or other plates or flanges 5, 6 may be detachably connected as by the bolts 8 which may engage the threaded holes 7 in these detachable flanges and hold them securely in place in connection, if desired, with an inner projection or collar fitting within the central aperture in these detachable flanges. These detachable flanges 5, 6 may thus form a replaceable resilient coupling unit in connection with the interposed resilient connecters 9 of spring wire of any desired form, preferably having the ends of each connecter rigidly secured in the opposing flanges so as to form one or more circumferential or radial series of connecters between the flanges so that part of these connecters operate in compression and part in tension when the coupling is in service. This arrangement makes it possible to have the detachable flanges and connecters made up for different degrees of resilient yield and stiffness so that they may be readily and quickly replaced to suit the particular service and also renewed in case of breakage or injury with a minimum of time and expense.

While I have shown in Fig. 1 two series of resilient connecters arranged in tandem it is of course evident that there may be more series, or only one series, or the several series may be arranged in parallel circumferentially one around the other. The middle flanges 3 and 4 may, if desired, be an integral part of a centerpiece 38, or as two separate parts with hubs 39 and 40 mounted on a connecting shaft. In some cases the middle flanges 4, 3 with the connecting piece 38 may be omitted and the middle plates or flanges 6, 5 merged in one piece.

Figs. 2 and 3 indicate an illustrative method of arranging such spring wire connecters and connecting them to the detachable flange coupling members 5, 6. One of these connecters which may be made of tempered spring steel wire an eighth to three-sixteenths of an inch in diameter more or less may have its ends 18, 19 bent laterally in opposite directions so as to fit into the corresponding holes in the flanges and one or more circumferential series of such holes may be formed parallel to the flange axes. The connecter ends may advantageously be rigidly connected to the flanges in any suitable way as by electric welding, forging or riveting methods and as shown in Fig. 3, these connecter ends may originally extend beyond the flanges as at 38 so that they may be engaged by electric welding devices. The connecter ends may thus be highly heated throughout the portions 19, for instance, so that they may be electrically welded by arc or resistance methods at 37 throughout more or less of the portion which extends within the flanges 5, 6, the projecting parts of the connecter ends being, if desired, removed when the welding or other rigid connection is completed. These connecters are preferably arched or bent up between their ends at least to a sufficient extent so that the central portion of each connecter is carried out of line with the lateral or end portions of the other connecters in the series. The lateral portions 15, 16 of these connecters may thus be bent or arched sufficiently to carry the one or more cushioning loops or coils 17 radially out of line with the ends of the other connecters of this circumferential series, part of which may have their central portions extend radially inward while the others may have their central portions extend radially outward with advantage. The outwardly extending series of connecters may have oppositely transversely extending connecter ends 13, 14 which may be rigidly connected to the two flanges 5, 6 in any desired way and may have a generally arched form, their lateral portions 10, 12 extending out sufficiently so that the one or more interposed cushioning coils 11 are carried out of line with the end and other portions of the other connecters of this circumferential series.

The action of such connecters can be understood more clearly by considering that the flange or member 5 is the driving member moving in the direction of the arrows in Figs. 1 and 3 so as to exert forces in the direction of the arrows in Fig. 2 on the ends of the connecters which are engaged by this driving flange which has been removed for clearness in Fig. 2. The outwardly extending connecters of this series are thus seen to be acting under compression forces exerted on their ends 13 so that their bent lateral portions 10, 12 tend to arch up and their loops 11 tend to open somewhat under these compression driving forces. The inwardly extending connecters are, as indicated, under tension forces exerted on their ends 18 so that their lateral portions 15, 16 tend to be drawn more nearly into a straight line and their cushioning loops 17 tend to close under these tension driving forces and these forces and movements tend to neutralize each other so as to substantially eliminate radial and axial effective forces between the coupling flanges and members under operating conditions. This can be seen in connection with the axial components and forces by reference to Fig. 3 in which the compression connecters which tend to force these two flanges apart have this action counter-balanced and neutralized by the tendencies of the tension connecters which are arranged in an oppositely diagonal position to draw the two flanges 5, 6 together. It will also be seen that this type of spring wire connecter may have its ends rigidly held in the coupling flanges so that all the cushioning and misalignment movements occur through the resilient yielding of the intermediate portions of the connecter where they can take place without any substantially sliding movement or wear which greatly promotes the life of this type of coupling where the connecters are designed to have the resilient yielding take place well within their elastic limit.

Other shapes and style of spring wire connecters may be used in such couplings and in Fig. 4 the connecter is shown as having curved or arched up lateral portions 21, 23 to give it a generally arched up contour while several radially extending cushioning coils 22 are formed in this integral resilient connecter to give it a sufficient range of cushioning action. Fig. 5 shows an arched up connecter 24 without any coils so that it has greater stiffness and strength with correspondingly less resilient yielding action which is desirable for some types of service. Fig. 6 shows another form of connecter in which the lateral portions 26, 27 are of generally arched or curved up form while a reverse bend or sinuous portion 25 is formed adjacent the central part of the connecter, all of these parts between the connecter ends being, if desired, arranged in a single plane. Fig. 7 is another somewhat similar type of sinuous spring wire connecter in which several reverse bends 28, 29, 30 may be formed adjacent the central part of the connecter which may either extend in a radial plane substantially perpendicular or transverse to the connecter ends 13, 14 or otherwise, and bent lateral portions 31, 32 may be formed near these connecter ends to give still further yielding action.

Various types of integral spring wire coil connecters may be used in which the coils may be arranged in any desired plane and one or more single coils or multiple turn coils employed, as desired. Fig. 8 shows a coil connecter in which one or more coils 11 may be formed adjacent the central part of the spring wire connecter which may have substantially straight lateral portions 33, 34 preferably angularly disposed with respect to each other to properly transmit the driving forces to the coil and to carry this central part of the connecter out of line with the connecter ends to the desired extent. Fig. 9 shows another arrangement in which the spring wire connecter may be formed with straight or angularly disposed lateral portions on each side of the coil 35 which in this instance may be arranged substantially parallel to the oppositely extending connecter ends 18, 19 so as to be arranged circumferentially or tangentially in the coupling instead of more or less radially and such a cushioning coil may have one or more turns so as to give the desired amount of resilient cushioning action. Fig. 10 shows another arrangement in which a multiple turn cushioning coil 36 is formed in the intermediate or central portion of the wire connecter so as to extend in a generally radial direction transverse to the connecter ends 18, 19 and it is, of course, understood that where multiple turn or other cushioning coils are used in such connecters it is desirable to have their different turns at least sufficiently separated from each other so that there is no undesirable rubbing or wearing action between them under service conditions.

This invention has been described in connection with a number of illustrative embodiments, forms, proportions, sizes, materials, numbers and arrangements of parts and methods of manufacture and use, to the details of which disclosure the invention is not of course to be limited since what is claimed as new and what is desired to be secured by Letters Patent is set forth in the appended claims.

1. The resilient coupling comprising coupling members and a plurality of circumferential series of one-piece resilient spring wire connecters having ends rigidly connected to the opposed coupling members to form a driving connection between them, each of said circumferential series of connecters comprising connecters having radially outwardly bent central portions provided with radially inwardly projecting integral cushioning coils, and comprising diagonally oppositely arranged connecters having radially inwardly extending central portions provided with radially outwardly extending integral cushioning coils to minimize substantially axial components of the driving forces of said connecters.

2. The resilient coupling comprising coupling members and a circumferential series of resilient spring wire connecters having ends rigidly connected to the opposed coupling members to form a driving connection between them, said circumferential series of connecters comprising connecters having radially outwardly bent central portions provided with radially inwardly projecting integral cushioning coils, and comprising diagonally oppositely arranged connecters having radially inwardly extending central portions provided with radially outwardly extending integral cushioning coils to minimize substantially axial components of the driving forces of said connecters.

3. The resilient coupling comprising coupling members and a circumferential series of resilient spring wire connecters having ends rigidly connected to the opposed coupling members to form a driving connection between them, said circumferential series of connecters comprising connecters having radially outwardly bent central portions provided with radially inwardly projecting integral bent resilient cushioning portions, and comprising diagonally oppositely arranged connecters having radially inwardly extending central portions provided with radially outwardly extending integral bent resilient cushioning portions to minimize substantially axial components of the driving forces of said connecters.

4. The resilient coupling comprising coupling members and a plurality of circumferential series of one-piece resilient spring wire connecters having bent intermediate portions and ends rigidly connected to the opposing coupling members, said connecters comprising connecters arranged in oppositely inclined position to minimize axial components of the driving forces of said connecters.

5. The resilient coupling comprising coupling members and a plurality of circumferential series of opposing tension and compression resilient spring wire connecters having ends rigidly connected to the opposing coupling members.

6. The resilient coupling comprising detachable annular coupling members and a circumferential series of one-piece resilient spring wire connecters each having a resiliently yielding central portion bent radially out of line with the connecter ends and having oppositely extending ends rigidly connected to the opposing coupling members to form in connection therewith a renewable resilient coupling unit, said circumferential series of connecters comprising a substantially equal number of connecters extending in oppositely inclined position between said coupling members and having their resiliently bent central portions extending in radially opposite directions to substantially neutralize the axial components of the driving forces of said connecters.

7. The resilient coupling comprising coupling members and a circumferential series of one-piece resilient spring wire connecters each having a resiliently yielding central portion bent out of line with the connecter ends and having oppositely extending ends rigidly connected to the opposing coupling members, said circumferential series of connecters comprising a number of connecters extending in oppositely inclined position between said coupling members and having their resiliently bent central portions extending in radially opposite directions to largely neutralize the axial components of the driving forces of said connecters.

8. The resilient coupling comprising coupling members and a series of one-piece resilient spring wire connecters each having a resiliently yielding central portion bent out of line with the connecter ends and having oppositely extending ends rigidly connected to the opposing coupling members, said series of connecters comprising connecters extending in oppositely inclined position between said coupling members to largely neutralize the axial components of the driving forces of said connecters.

9. The resilient coupling comprising detachable annular flanges having opposing faces and a circumferential series of one-piece resilient spring wire connecters each having oppositely extending ends rigidly connected to the opposing flanges to form in connection therewith a renewable resilient coupling unit, said circumferential series of connecters comprising a number of connecters extending in oppositely inclined position between said flanges and having resiliently bent central portions extending in radially opposite directions, to minimize substantially axial components of the driving forces of said connecters.

10. The resilient coupling comprising detachable flanges having opposing faces and a circumferential series of resilient spring wire connecters each having oppositely extending ends rigidly connected to the opposing flanges to form in connection therewith a renewable resilient coupling unit, said circumferential series of connecters comprising a number of connecters extending in oppositely inclined position between said flanges to minimize substantially axial components of the driving forces of said connecters.

11. The resilient coupling comprising coupling members and a circumferential series of resilient spring wire connecters each having a resiliently yielding central portion bent out of line with the connecter ends and having oppositely extending ends rigidly connected to the opposing coupling members, said circumferential series of connecters comprising connecters extending in oppositely inclined position between said coupling members.

12. The resilient coupling comprising coupling members and a series of resilient spring wire connecters each having a resiliently yielding central portion bent out of line with the connecter ends and having ends rigidly connected to the opposing coupling members, said series of connecters comprising either direction of rotation load carrying connecters extending axially in oppositely inclined position between said coupling members.

13. The resilient coupling comprising coupling members and a series of one-piece resilient spring wire connecters having bent resiliently yielding free intermediate portions not otherwise restrained than through the ends of the connecters and ends rigidly connected to the opposing coupling members to cushion the driving connection between them without substantial sliding movement or wear of said connecters, said series of connecters comprising connecters extending in oppositely inclined position between said coupling members to minimize the axial components of the driving forces of said connecters.

14. The resilient coupling comprising detachable coupling members and a circumferential series of one-piece resilient spring wire connecters having coiled resiliently yielding free intermediate portions not otherwise restrained than through the ends of the connecters and ends rigidly connected to the opposing coupling members to cushion the driving connection between them without substantial sliding movement or wear of said connecters to form in connection therewith a renewable resilient coupling unit, said circumferential series of connecters comprising connecters extending in oppositely inclined position between said coupling members.

15. The resilient coupling comprising coupling members and a series of one-piece resilient spring wire connecters having coiled resiliently yielding free intermediate portions not otherwise restrained than through the ends of the connecters and ends rigidly connected to the opposing coupling members to cushion the driving connections between them without substantial sliding movement or wear of said connecters, said series of connecters comprising connecters extending in oppositely inclined position between said coupling members.

16. The resilient coupling comprising two cooperating coupling members and a plurality of resiliently connected coupling units interposed between said coupling members and constituting the driving connection between them, each of said units comprising a pair of opposing coupling flanges and a circumferential series of one-piece resilient spring wire connecters each having a coiled resiliently yielding central portion bent up out of line with the connecter ends and having oppositely extending ends rigidly connected to the opposing coupling flanges, said circumferential series of connecters extending in oppositely inclined position to substantially neutralize the axial components of the driving forces of said connecters.

17. The coupling comprising two cooperating coupling members and a pair of resiliently connected coupling units interposed between said coupling members and constituting the driving connection between them, each of said units comprising a pair of opposing coupling flanges and a circumferential series of one-piece resilient spring wire connecters extending axially in oppositely inclined position each having a resiliently yielding central portion bent up out of line with the connecter ends and having oppositely extending ends connected to the opposing coupling flanges.

18. The yieldable coupling comprising rigid coupling members and a series of resilient spring wire connecters extending axially in oppositely inclined position having bent resiliently yielding free intermediate portions not otherwise restrained than through the ends of the connecters and oppositely extending ends connected to the opposing coupling members to constitute the driving connection between them to minimize axial components of the driving forces of said connecters.

19. The yieldable coupling comprising coupling members and a circumferential series of resilient spring wire connecters having bent resiliently yielding free intermediate portions not otherwise restrained than through the ends of the connecters and oppositely extending ends connected to the opposing coupling members to constitute the driving connection between them without substantial and undesirable sliding movement and wear of said connecters, said circumferential series of connecters comprising connecters acting as tension and compression connecters respectively.

20. The yieldable coupling comprising a circumferential series of one-piece resilient spring wire connecters having bent resilient yielding free intermediate portions not otherwise restrained than through the ends of the connecters to constitute the driving connection without substantial sliding movement and wear of said connecters, said circumferential series of connecters comprising connecters extending in oppositely inclined position and having resiliently bent central portions extending in radially opposite directions to minimize axial components of the driving forces of said connecters.

21. The yieldable coupling comprising a circumferential series of resilient spring wire connecters having rigidly supported ends and resiliently yielding free intermediate portions not otherwise restrained than through the ends of the connecters to constitute the driving connection without substantial sliding movement and wear of said connecters.

ROBERT A. SMITH.